C. L. COOK.
METALLIC PACKING.
APPLICATION FILED OCT. 16, 1908.
925,459.
Patented June 22, 1909.
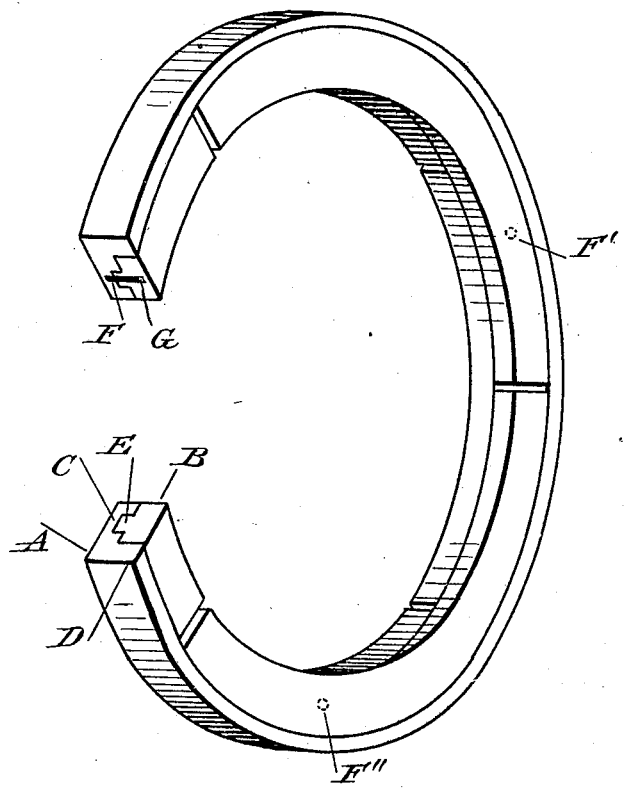
Charles Lee Cook
Inventor
Witnesses:
Katherine Arnett.
Jacob S. Luscher    By his Attorney Bradford Webster

UNITED STATES PATENT OFFICE.

CHARLES LEE COOK, OF LOUISVILLE, KENTUCKY.

METALLIC PACKING.

No. 925,459.  Specification of Letters Patent.  Patented June 22, 1909.

Application filed October 16, 1908. Serial No. 458,043.

*To all whom it may concern:*

Be it known that I, CHARLES LEE COOK, a citizen of the United States, residing at Louisville, in the county of Jefferson and State of Kentucky, have invented a new and useful Compound Metallic Ring, of which the following is a specification.

My invention relates to compound metallic rings in which there is an outer and an inner ring, fitting each other closely, each cut into two or more segments; and the objects of my improvement are, first, to fit the inner ring more snugly and firmly to the outer ring; second, to make the ring in its inherent structure elastically expansive and contractive; and, third, to afford facilities for keeping the segments of the inner ring in proper position with reference to the segments of the outer ring. I attain these objects by the mechanism illustrated in the accompanying drawing, in which—

The figure is a perspective view of the entire ring, with two cross sections, one cross section being made at a point where one of the blind dowel pins connects a segment of the inner ring with a corresponding segment of the outer ring.

Each of the inner and outer rings of the compound ring is cut into two or more segments. The outer ring A has a projection D, which serves to overlap the inner ring B, thus sealing the openings between the segments of the inner ring. The ring A is grooved at C on its face, under projection D, to receive a corresponding projection E on ring B, which fits snugly into ring A. When this compound ring is used as a metallic packing for engines, the inner and outer ring are held in exact relation to each other, making it impossible for one ring to wear faster than the other on the rod. This overcomes a defect in similar packing which has been especially troublesome in gas engine service, where the gas gets between the rings and explodes. Where high pressures are exerted on the circumference, if there is no connection between the rings, they act independently and, because there is not sufficient metal to prevent it, the rings warp and wear faster on the rod in one place than another. The projection and groove prevent all this and guide the rings so evenly as to make them virtually one with respect to all strains and stress to which they may be subjected. Ring B is originally turned to a smaller diameter than ring A, so that, when the projection on ring B is forced into the groove C of ring A, ring B is expanded to the diameter of ring A, ring A being given sufficient strength by a proper volume of metal to prevent its springing inwardly from the spring tension of ring B. Thus ring B, in the compound ring, has a constant centerward spring tension, which, when the ring is used as a packing, mutually closes both rings A and B of the compound ring to the rod as they wear. This is the most important feature of my invention, because it does away with the necessity of an external spring to compress the rings to the rod, substituting therefor a spring created by the structure of the parts.

Dowel pins F, F', and F'' connect each segment of the outer ring with a corresponding segment of the inner ring, in such a way that the end of each segment of the outer ring ends at about the middle of the corresponding segment of the inner ring. This prevents the openings between the segments of the outer ring from coinciding with the openings between the segments of the inner ring, which would destroy the continuity of the compound ring. Hole G for dowel pin F is not drilled through either outer wall of the ring, making dowel pin F blind and preventing it from backing out and striking the walls of the chambers of the main packing case into which the rings are inserted, when used as a packing. Thus also the rings are less weakened than if hole G were drilled clear through.

I claim:

An elastically expansive and contractive compound ring, having an outer and an inner ring, each cut into segments, the outer ring having a larger and wider cross-section than the inner ring, the segments of the inner ring having a projection which fits closely into the outer ring, the curvature of the projection being sharper than the curvature of the groove which receives it, and the segments of the inner ring being held in a position of centerward stress by the segments of the outer ring.

CHARLES LEE COOK.

Witnesses:
ROBT. C. BALDWIN,
MARGARET M. GNOW.